United States Patent
Spannheimer et al.

(10) Patent No.: US 7,469,765 B2
(45) Date of Patent: Dec. 30, 2008

(54) METHOD FOR STEERING A VEHICLE THAT IS TO BE BACKED INTO A PARKING SPACE

(75) Inventors: Helmut Spannheimer, Neukeferloh (DE); Alfred Pruckner, Munich (DE); Karl-Heinz Meitinger, Trostberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 155 days.

(21) Appl. No.: 11/143,459

(22) Filed: Jun. 3, 2005

(65) Prior Publication Data

US 2005/0236201 A1  Oct. 27, 2005

Related U.S. Application Data

(63) Continuation of application No. PCT/EP03/13234, filed on Nov. 21, 2003.

(30) Foreign Application Priority Data

Dec. 5, 2002 (DE) ............................. 102 56 770

(51) Int. Cl.
*B60S 9/00* (2006.01)
*G05D 1/00* (2006.01)
(52) U.S. Cl. ...................... 180/204; 701/28
(58) Field of Classification Search ........... 180/204; 701/28, 36, 41; 240/932.2
See application file for complete search history.

(56) References Cited

U.S. PATENT DOCUMENTS 5,646,845 A * 7/1997 Gudat et al. ............ 701/41
5,742,141 A 4/1998 Czekaj
6,170,591 B1 1/2001 Sakai et al.
6,424,895 B1 * 7/2002 Shimizu et al. ........... 701/41

(Continued)

FOREIGN PATENT DOCUMENTS

DE  38 44 340 A1  7/1990

(Continued)

OTHER PUBLICATIONS

Int'l Search Report, dated May 24, 2004 and English Translation of relevant portion (Eight (8) pages).

*Primary Examiner*—Joanne Silbermann
*Assistant Examiner*—Daniel Yeagley
(74) *Attorney, Agent, or Firm*—Crowell & Moring LLP

(57) ABSTRACT

A method is provided for steering a vehicle that is to be backed into a parking space. Starting from an initial position outside the parking space, a reverse trajectory that is to be traveled to attain the parked position is determined. The vehicle reverses through five curve sections, and steering of the vehicle during the reversing procedure is controlled by an electronic control system in accordance with the reverse trajectory. When viewed from the driving direction, the second curve section represents a clothoid section, the third represents an arc section, the fourth represents an additional clothoid section and the fifth represents an additional arc section. In its initial position, the vehicle is at an angle to the longitudinal direction of the parking space and the first curve section, through which the vehicle reverses and which lies between the initial position and the start of the second curve section, is represented by a different geometrical function than the second curve section.

15 Claims, 2 Drawing Sheets

U.S. PATENT DOCUMENTS

| | | |
|---|---|---|
| 6,543,414 B2 * | 4/2003 | O'Neil et al. ............... 123/350 |
| 7,043,346 B2 * | 5/2006 | Kubota et al. ............ 340/932.2 |
| 7,075,456 B2 * | 7/2006 | Tanaka et al. ............ 340/932.2 |
| 2002/0109679 A1 * | 8/2002 | Masunaga ................... 345/212 |
| 2004/0260439 A1 * | 12/2004 | Endo et al. .................... 701/36 |
| 2005/0021203 A1 * | 1/2005 | Iwazaki et al. ................ 701/36 |
| 2006/0030987 A1 * | 2/2006 | Akita .......................... 701/41 |
| 2008/0033606 A1 * | 2/2008 | Okamoto et al. .............. 701/28 |

FOREIGN PATENT DOCUMENTS

| | | |
|---|---|---|
| DE | 198 09 416 A1 | 9/1999 |
| DE | 199 40 007 A1 | 3/2001 |
| EP | 0 849 144 B1 | 6/1998 |
| FR | 2 785 383 A1 | 5/2000 |

* cited by examiner

METHOD FOR STEERING A VEHICLE THAT IS TO BE BACKED INTO A PARKING SPACE

CROSS-REFERENCE TO RELATED APPLICATIONS

This application is a continuation of PCT Application No. PCT/EP2003/013234 filed on Nov. 21, 2003, which claims priority to German Application No. 102 56 770.0 filed Dec. 5, 2002.

BACKGROUND AND SUMMARY OF THE INVENTION

The present invention relates to a method of steering a vehicle that is to be backed into a parking space. From an initial position outside the parking space until a parked position in the parking space has been reached, the vehicle is successively reversed through five curve segments, which each flow into one another without any kinks. The last four curve segments, viewed in the driving direction, are: a) the second curve segment being a clothoid segment; b) the third curve segment being a circular-arc segment; c) the fourth curve segment being another clothoid segment; and d) the fifth curve segment being another circular-arc segment.

From German Patent document DE 199 40 007, a method is known of reversing (or backing) a vehicle into a parking space. Based on a starting position, in which the vehicle is situated diagonally in front of the parking space and parallel to the longitudinal direction of the parking space, an electronic system computes a desired trajectory consisting of several clothoid and circular-arc segments. The electronic system controls the steering such that, from the initial position, the vehicle successively drives through the following curve segments:

a first clothoid segment,
 a first circular-arc segment,
 a second clothoid segment, and
 a second circular-arc segment.

During the parking space entering operation, the actual trajectory is compared with the desired trajectory. Deviations are compensated by a corresponding control of the steering angle. German Patent document DE 199 40 007 A1 explicitly describes only a parking space entering operation during which the vehicle to be parked is situated parallel to the parking space in its initial position. In practice, this is not so in most cases. Tests have shown that, in particular, the position at the beginning of the parking space entering operation has to be known very precisely and even slightly "diagonal positions" of the vehicle can cause relatively large deviations from the "desired parking space entering position".

It is an object of the invention to provide an improved method of steering a vehicle to be backed into a parking space.

This method of steering a vehicle as it backs into a parking space is achieved, in that from the initial position of the vehicle, the entire path is determined through which the reversing has to take place until the parked position is reached, and the steering during the reversing of the vehicle is controlled by an electronic control unit corresponding to this path. The vehicle is situated in the initial position diagonally with respect to the longitudinal direction of the parking space, and the first curve segment through which the vehicle is to be reversed, and which lies between the initial position and the beginning of the second curve segment, is described by a different geometrical function than the second curve segment. Advantageous embodiments and further developments of the invention are described and claimed herein.

The invention is based on a steering method in which, from an initial position in which the vehicle is situated diagonally in front of the parking space, the vehicle reverses (or backs) successively through five curve segments, which each flow into one another without any kinks, until a parked position is reached in the parking space. The last four curve segments, viewed in the driving direction, are the following types of curves:

the second curve segment is a clothoid segment;
 the third curve segment is a circular-arc segment;
 the fourth curve segment is another clothoid segment; and
 the fifth curve segment is another circular-arc segment.

The invention consists of the fact that, in the initial position, that is, at the beginning of the parking space entering operation, the vehicle can be situated at an arbitrary angle diagonally with respect to the longitudinal direction of the parking space, and that the first curve segment through which the vehicle is to be reversed (and which lies between the initial position and the beginning of the second curve segment) is described by a different geometrical function than the second curve segment. By using an electronic measuring system, the position and the alignment of the vehicle relative to the parking space is detected in the initial position. Using a defined mathematical vehicle model, a desired trajectory is computed for this purpose. During the entering operation into the parking space, the steering of the vehicle is then controlled corresponding to the desired trajectory. It is essential that this is a true control and not an automatic control of the steering that would require considerably higher expenditures in comparison to a control.

The first curve segment can be a straight line or also a clothoid. It is important that the first curve segment is smooth; that is, that it changes into the second curve segment without kinks. The basic fact is that, during the entire entering operation into the parking space between the initial position and the parked position, the steering is controlled such that the steering angle changes take place continuously or seamlessly. This has the advantage that, when entering the parking space, the vehicle does not have to be stopped at the transitions between individual curve segments but can be driven without stopping from the initial position into the parked position.

Furthermore, it may be provided that the "control for entering the parking space" can be activated by the driver only when the vehicle is standing still, the momentary vehicle position and the vehicle position relative to the parking space then being defined as the initial position by the electronic parking space entering control. It can preferably be provided that, for entering the parking space, the vehicle has to be set into motion by the driver and the driving speed has to be defined by the driver during the entire parking space entering operation. For reasons of safety, it can be provided that the speed defined by the driver, if necessary, is limited to a defined maximal speed.

According to the invention, the steering angle to be controlled-in by the electronic control system for the parking space entering operation is determined relative to the path to be reversely traveled by the vehicle. A "path-related steering angle" has the advantage that the steering can be controlled independently of the vehicle speed during the parking space entering operation.

Furthermore, it may be provided that the vehicle is braked by the driver during the, and at the end of, the parking space entering operation. For safety reasons, it can be provided that, during the entire reversing operation into the parking space, the rearward vehicle area is monitored by means of spacing sensors and the vehicle is automatically braked when an obstacle appears in the rearward vehicle area.

For reasons of completeness, it is pointed out that the method can also be used for a transverse parking or diagonal parking, if a zero steering angle is controlled-in in the fifth curve segment, that is, a straight line is driven.

The method is suitable for driving into parking spaces on the left or right side of the road. The curve segments are in each case only mirror-inverted.

The respective lengths of the curve segments depend on the vehicle geometry and the vehicle kinematics, the parking space geometry and the initial position of the vehicle at the beginning of the parking space entering operation, and are defined at the beginning of the parking space entering operation.

If the parking space is too short in order to come to be situated parallel to the road in one "move", the fifth curve segment can be reversed in a correspondingly shortened manner and the diagonally situated vehicle can be brought to a stop by maneuvering parallel to the edge of the road. The steering wheel is preferably automatically rotated by the parking space entering control during the parking space entering operation.

At least when driving through the fifth curve segment, the approach to the rearward parking space end can be monitored by the use of conventional spacing sensors, such as ultrasound, radar or laser sensors, and, if necessary, the length of the fifth curve segment can be corrected during the reversing. As a result, it is prevented that, in the event of measuring errors when measuring the parking space, the vehicle collides with the rear vehicle. Furthermore, by using the spacing sensor system, the rearward vehicle area can be monitored during the entire parking space entering operation, and the vehicle can be automatically braked when an obstacle, such as a pedestrian, appears in the rearward vehicle area. However, this does not lead to a stoppage of the automatic parking space entering operation.

Before the actual parking space entering operation is carried out, the vehicle first drives laterally past the parking space, and the parking space is measured by a suitable sensing system. Simultaneously, the momentary vehicle position and the vehicle position relative to the parking space is detected. The "scanning" of the parking space by the vehicle sensing system can either be activated explicitly by the driver or can be active during the entire drive. In the latter case, the "scanning mode" can also be activated as a function of defined speed limits, for example, only at a speed below a defined maximal speed. After a sufficiently large parking space has been detected, the driver is informed thereof visually, for example, in the center console, or acoustically. Subsequently, when the vehicle is stopped, the driver has to actively start the parking space entering operation. For this purpose, for example, a key or a switch can be provided in the area of the shifting lever or of the center console. As an alternative, the parking space entering operation could also be started by a manual engaging of the reverse gear by the driver. After the start of the parking space entering operation, the electronic parking space entering system takes over the control of the steering. In the case of vehicles with a conventional steering, this can take place, for example, by way of a servo motor applied to the steering column. In the case of individual wheel steerings, the wheels to be steered are individually controlled by the electronic steering system.

It is preferably provided that the driver has to actively start the movement of the vehicle in order to start the parking space entering operation. In the case of vehicles with an automatic transmission, this can take place by engaging the reverse gear and by releasing the brake. The vehicle will then automatically "creep" into the parking space. However, the driver can stop the vehicle at any time by operating the brake. The parking space entering operation is then continued by another start. An analogous approach can also be carried out in the case of vehicles with manual transmissions or automated manual transmissions. Here, it can also be provided that the driver has to start the vehicle himself and define the desired speed.

For safety reasons, it may be provided that the speed of the vehicle during the parking space entering operation is limited to a defined maximal speed. In addition, it may be provided that the maximal speed during the parking space entering operation is defined as a function of the steering angle change rate to be expected momentarily. This has the advantage that the demands on the steering speed are reduced and a cost-effective steering angle actuator can be used, which requires little space.

If a further maneuvering is required when the parking space has been reached, the required driving direction can be indicated to the driver, for example, visually or acoustically. The driver then has to engage the corresponding gear or the corresponding selector lever position and is informed of the vehicle movement to be expected. The start of the vehicle movement again takes place actively by the driver. The braking of the vehicle to the stoppage at the end of the parking operation or when a maneuvering reversing point has been reached can either take place automatically by means of the system or the driver can be informed thereof by use of visual, acoustic, and/or haptic information.

As an alternative, the longitudinal control of the vehicle can also take place completely by use of the parking assistance system. The parking space entering operation will then take place by activating a key button. This key button has to be held in a depressed manner during the entire parking space entering operation. The vehicle will then start driving independently. When the key button is released, the parking space entering operation is interrupted and the vehicle is stopped. The driver should nevertheless himself take over the operation of the transmission selector lever for selecting the driving direction, so that he is informed of the moving direction to be expected.

Other objects, advantages and novel features of the present invention will become apparent from the following detailed description of the invention when considered in conjunction with the accompanying drawings.

DETAILED DESCRIPTION OF THE DRAWINGS

Figure 1:
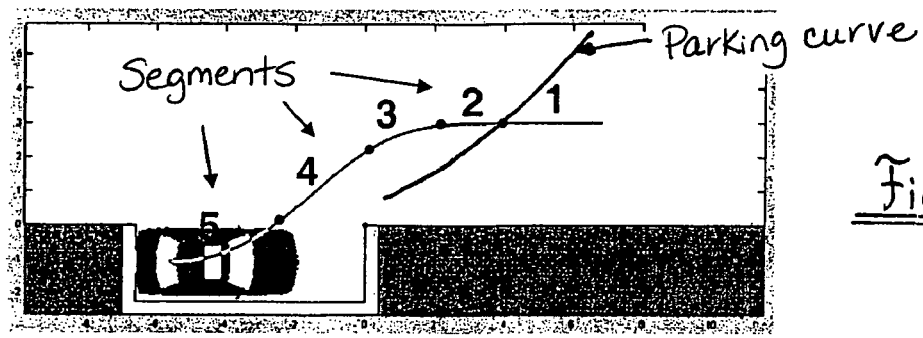
FIG. 1 illustrates a special case in which, in an initial position, the vehicle is situated parallel to the longitudinal direction of the parking space, which occurs infrequently in practice.

In the case of the parking space entering operation illustrated in FIG. 1, the vehicle is in the initial position parallel to the longitudinal direction of the parking space. In curve segment 1, the vehicle is driven straight toward the rear. Here, the steering has a steering angle of zero. When a vehicle position is reached in which a mathematically determined fictitious parking curve is intersected, the actual steering operation will start. The second curve segment is a clothoid segment. Curve segment 3 is a circular arc. Curve segment 4 again is a clothoid segment, and curve segment 5 is a circular arc.

Normally, initial positions occur in practice in which the vehicle is situated diagonally (or not completely parallel) to the longitudinal direction of the parking space. This normal situation is illustrated in FIGS. 2 and 3.

Figure 2:
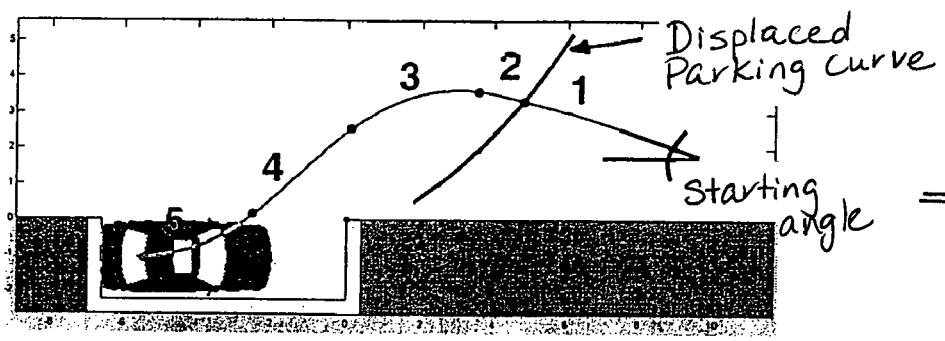
FIGS. 2 and 3 illustrate initial positions in which the vehicle is situated diagonally with respect to the longitudinal direction of the parking space.
Figure 3:
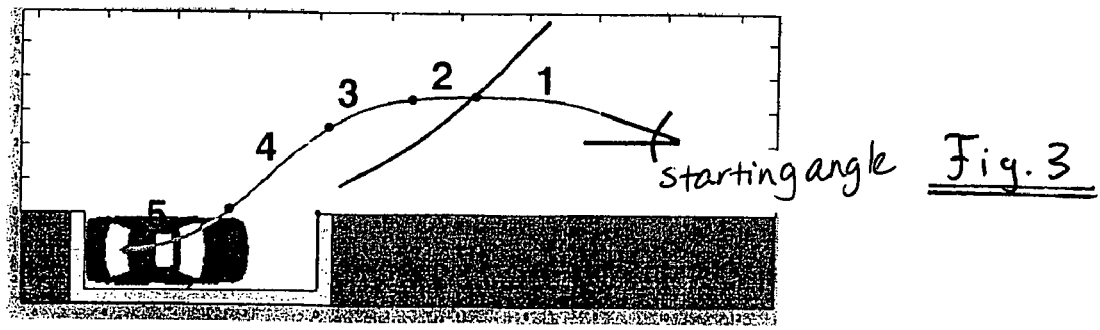

From the initial position, the vehicle is reversed (or backed) in a straight line in curve segment 1 during the parking space entering operation of FIG. 2. Curve segment 1 is followed by clothoid segment 2. Curve segment 3 is a circular arc 3. Curve segment 4 again is a clothoid segment. Curve segment 5 is a circular arc.

As an alternative, the vehicle is first reversed from a diagonal initial position along a first curve segment which is formed by a first clothoid. The first clothoid is followed by the second curve segment which is also a clothoid but is described by a different clothoid function. Curve segment 3 is again a circular-arc segment; curve segment 4 is another clothoid segment; and curve segment 5 is a circular-arc segment.

Figure 4:
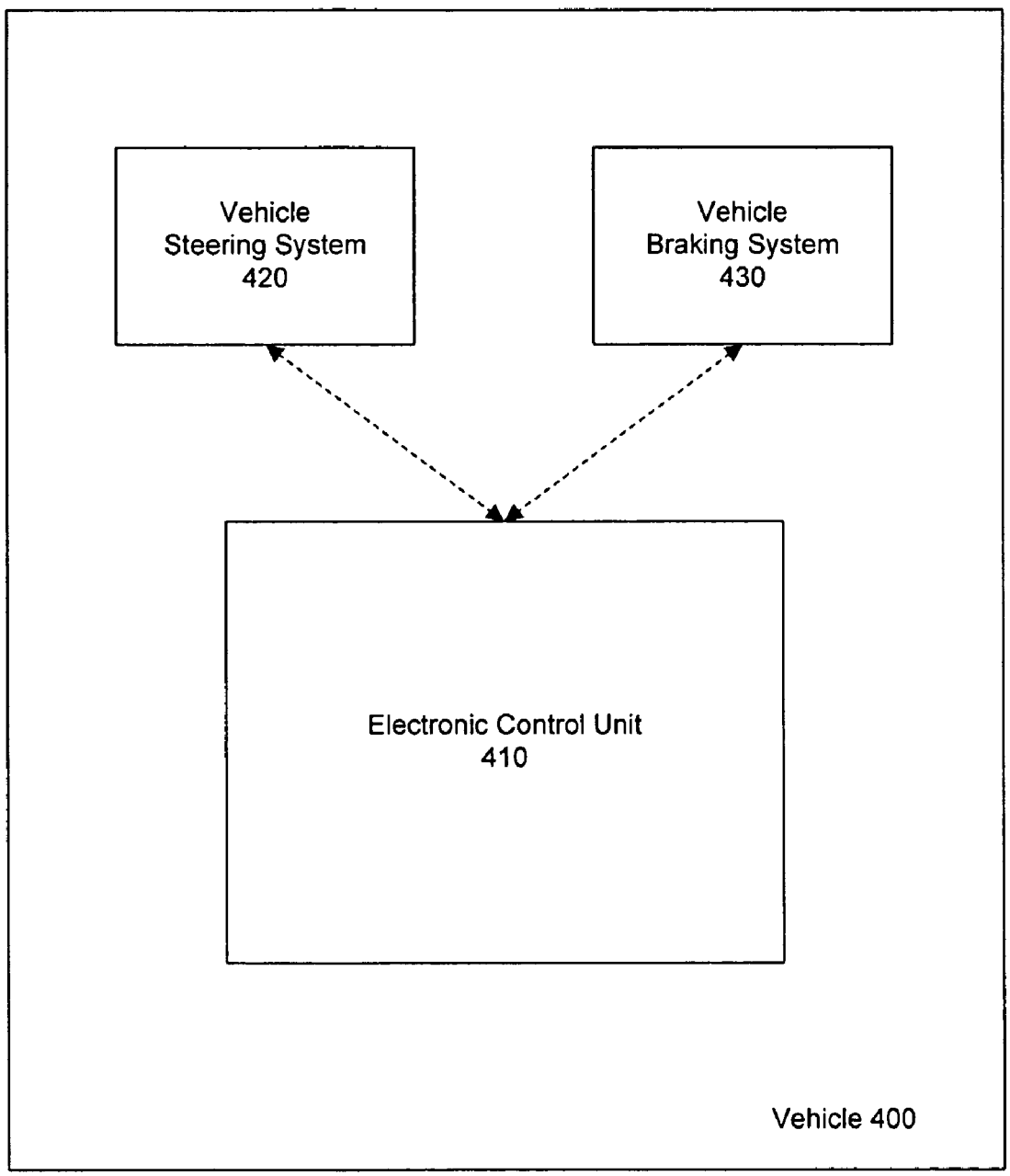
FIG. 4 illustrates an electronic control unit consistent with the present invention.

FIG. 4 illustrates an exemplary electronic control unit 410 consistent with the present invention. Electronic control unit 410 may include one or more stored program code segments that determine an entire path or reverse trajectory through which a vehicle 400 must reverse to attain a parked position. Electronic control unit 410 may also include program segments that control steering of vehicle 400 during the reversing beginning from an initial position over the entire path vehicle 400 reverses. In addition, electronic control unit 410 may include program segments that define the curve segments through which vehicle 400 successively reverses.

Electronic control unit 410 may use a defined mathematical vehicle model to compute a desired reverse trajectory. This may be based on the detected position and alignment of vehicle 400 relative to the parking space in the initial position and measurements of the parking space. During the entering operation into the parking space, electronic control unit 410 may interact with a vehicle steering system 420 to control the steering of vehicle 400 corresponding to the desired trajectory. Electronic control unit 410 may also interact with vehicle braking system 430 so that the vehicle is automatically braked when an obstacle is detected in the rearward vehicle area.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of steering a vehicle that is to be backed into a parking space, the vehicle being successively reversed through first, second, third, fourth, and fifth curve segments starting from an initial position outside the parking space until the vehicle attains a parked position in the parking space, each segment flowing seamlessly into a next segment and, when viewed in a driving direction, the second segment representing a clothoid section, the third segment representing an arc section, the fourth segment representing an additional clothoid section, and the fifth segment representing an additional arc section, the method comprising the acts of:

starting from the initial position of the vehicle, determining an entire reverse trajectory that is to be traveled to attain the parked position; and controlling steering of the vehicle during the reversing procedure by an electronic control system in accordance with said trajectory;

wherein in the initial position, the vehicle is at an angle to a longitudinal direction of the parking space, and further wherein the first curve segment, through which the vehicle reverses and which lies between the initial position and the start of the second curve segment, is represented by a first geometrical function different than a second geometrical function representing the second curve segment;

wherein, during the reversing operation when entering the parking space, the rearward vehicle area is monitored by spacing sensors, and the vehicle is automatically braked when an obstacle appears in the rearward vehicle area;

wherein a vehicle speed is defined by the driver during the entire parking space entering operation, and the vehicle speed defined by the driver is limited to a defined maximal speed; and wherein the defined maximal speed is defined as a function of a steering angle change rate.

2. The method according to claim 1, wherein steering wheel angle changes, which are controlled-in on the trajectory between the initial position and the parked position, are exclusively seamless continuous steering angle changes, so that the vehicle is drivable without stopping through the entire trajectory between the initial position and the parked position.

3. The method according to claim 2, further comprising the act of:

activating the parking space entering control by the driver only when the vehicle is stopped, the momentary vehicle position and the momentary vehicle position relative to the parking space being defined as the initial position.

4. The method according to claim 2, wherein movement of the vehicle has to be started by the driver for entering the parking space.

5. The method according to claim 1, further comprising the act of:

activating the parking space entering control by the driver only when the vehicle is stopped, the momentary vehicle position and the momentary vehicle position relative to the parking space being defined as the initial position.

6. The method according to claim 5, wherein movement of the vehicle has to be started by the driver for entering the parking space.

7. The method according to claim 1, wherein movement of the vehicle has to be started by the driver for entering the parking space.

8. The method according to claim 1, wherein a steering angle determined by the electronic control system is determined relative to the reversed path and independently of the speed.

9. The method according to claim 1, wherein the vehicle is braked by the driver during, and at the end of, the parking space entering operation.

10. The method according to claim 1, wherein the first curve segment is a straight line.

11. The method according to claim 1, wherein the first curve segment is a clothoid represented by a first clothoid function different than a second clothoid function representing the second curve segment.

12. The method according to claim 1, wherein, for reaching the initial position for the reversing, the vehicle is first driven forward laterally past the parking space and, during the driving past the parking space, the parking space geometry is scanned by spacing sensors and is stored in the electronic control system.

13. The method according to claim 1, wherein a center of the rear axle of the vehicle describes the five curve segments.

14. A method of backing a vehicle into a parking space, the method comprising the acts of:
- starting from an initial position of the vehicle outside the parking space, determining an entire path through which the vehicle must be reversed until the vehicle attains a parked position in the parking space;
- controlling steering of the vehicle during the reversing in accordance with the path by an electronic control unit, wherein the vehicle is situated in the initial position diagonally with respect to a longitudinal direction of the parking space, said controlling act further comprising the acts of:
- successively reversing the vehicle through five curve segments, each segment flowing seamlessly into the next, wherein the first curve segment lying between the initial position and a beginning of the second curve segment has a different geometrical function than the second curve segment, wherein the second curve segment is a clothoid segment,
- wherein a vehicle speed is defined by the driver during the entire parking space entering operation, and the vehicle speed defined by the driver is limited to a defined maximal speed;
- wherein the defined maximal speed is defined as a function of a steering angle change rate.

15. An electronic control unit for steering a vehicle that is to be backed into a parking space beginning from an initial position outside of the parking space, the control unit comprising:
- a computer readable medium having stored therein program code segments that:
- determine an entire path through which the reversing must take place to attain a parked position;
- control steering of the vehicle during the reversing beginning from an initial position situated diagonally with respect to a longitudinal direction of the parking space, said control operating over the entire path the vehicle reverses; and
- defines five curve segments through which the vehicle successively reverses in a seamless manner, a first curve segment lying between the initial position and a beginning of a second curve segment having a different geometrical function than the second curve segment,
- wherein a vehicle speed is defined by the driver during the entire parking space entering operation, and the vehicle speed defined by the driver is limited to a defined maximal speed;
- wherein the defined maximal speed is defined as a function of a steering angle change rate.

* * * * *